(12) United States Patent
Wang et al.

(10) Patent No.: US 7,834,594 B2
(45) Date of Patent: Nov. 16, 2010

(54) SYSTEM AND METHOD FOR REMOTE BATTERY SENSING

(75) Inventors: Ligong Wang, Round Rock, TX (US); Shane Chiasson, Pflugerville, TX (US); Anand Nunna, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 12/199,437

(22) Filed: Aug. 27, 2008

(65) Prior Publication Data

US 2010/0052623 A1 Mar. 4, 2010

(51) Int. Cl.
*H02J 7/04* (2006.01)
*H02J 7/16* (2006.01)

(52) U.S. Cl. ...................... 320/162; 320/106

(58) Field of Classification Search ............... 320/106, 320/162

See application file for complete search history.

(56) References Cited

U.S. PATENT DOCUMENTS

| | | | |
|---|---|---|---|
| 5,471,128 A * | 11/1995 | Patino et al. ............... | 320/128 |
| 5,534,765 A * | 7/1996 | Kreisinger et al. .......... | 320/106 |
| 5,606,241 A * | 2/1997 | Patino et al. ............... | 320/137 |
| 5,754,027 A | 5/1998 | Oglesbee et al. ............ | 320/5 |
| 6,420,854 B1 * | 7/2002 | Hughes et al. .............. | 320/165 |
| 6,526,294 B1 * | 2/2003 | Banh et al. ................. | 455/573 |

* cited by examiner

*Primary Examiner*—Edward Tso
*Assistant Examiner*—Ramy Ramadan
(74) *Attorney, Agent, or Firm*—Baker Botts L.L.P.

(57) ABSTRACT

Systems and methods for remote battery sensing and charging are disclosed. A method may include determining whether a charge output of a battery charger is electrically coupled to a rechargeable battery, wherein the charge output is configured to charge the rechargeable battery. The method may also include electrically coupling a terminal of the rechargeable battery to a reference voltage input of the battery charger in response to determining the charge output is electrically coupled to the rechargeable battery, wherein the battery charger is configured to determine whether the rechargeable battery is to be charged based on the reference voltage input voltage. The method may further include electrically coupling the reference voltage input to the charge output in response to determining the charge output is not electrically coupled to the rechargeable battery.

21 Claims, 3 Drawing Sheets

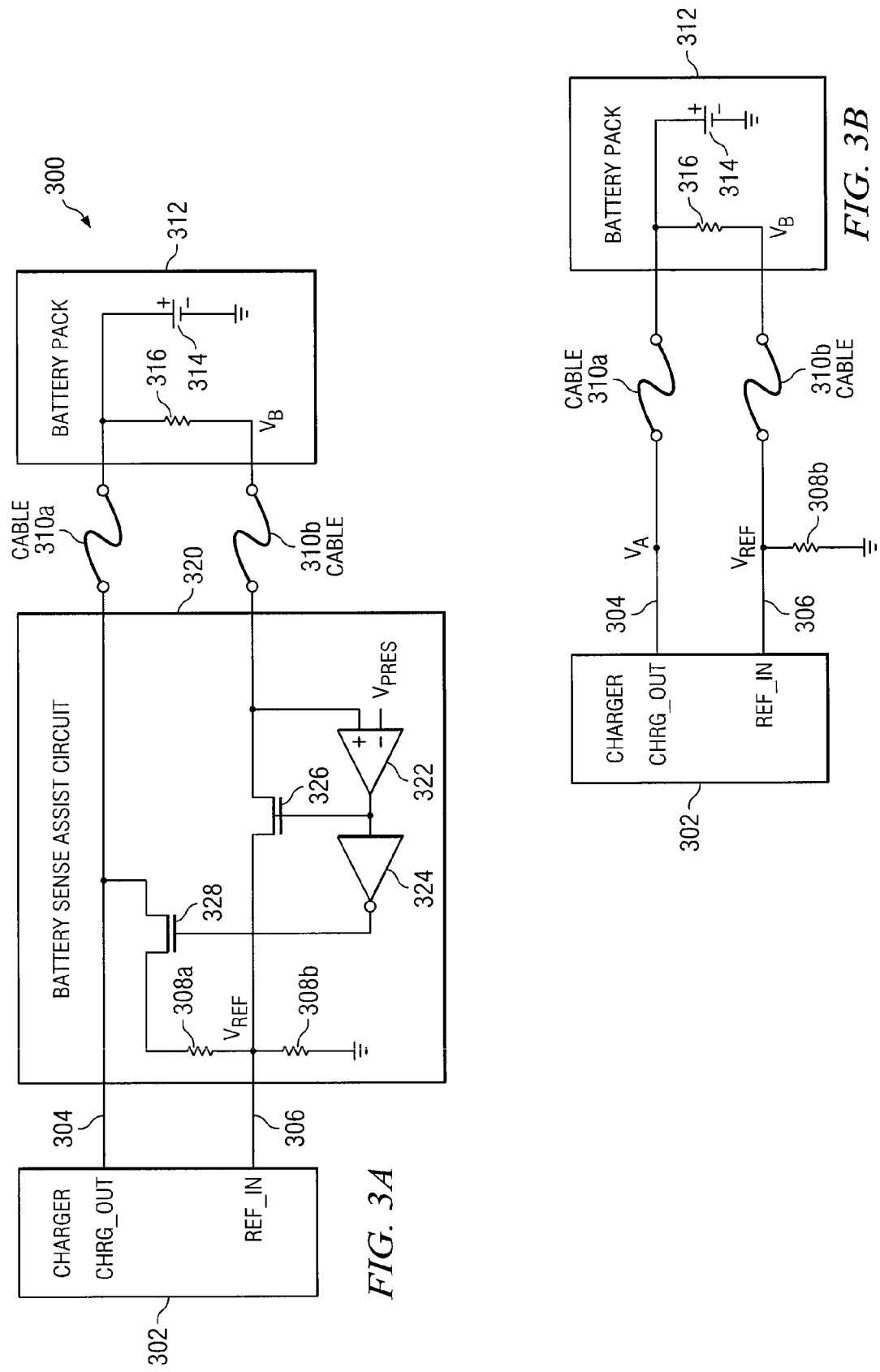

SYSTEM AND METHOD FOR REMOTE BATTERY SENSING

TECHNICAL FIELD

The present disclosure relates in general to battery sensing and charging, and more particularly to a system and method for remote battery sensing and charging.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of physical storage resources, such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a server chassis, to hundreds of physical storage resources disposed in one or more separate storage enclosures.

In addition, implementation of physical storage resource arrays may include one or more batteries. Such batteries may serve as a backup power source in the event of a failure of a main power source of a storage resource array or one its components. For example, in a power outage, batteries may provide backup power to storage resources for a time sufficient to allow for the power outage to end.

As another example, batteries may be used to provide backup power to write caches associated with storage resources. To illustrate, when data from an information handling system is to be written to a storage resource, rather than immediately store the data onto a storage resource's persistent storage (e.g., hard disk drives), the data may instead be stored in a write cache associated with the storage resource and a signal may be communicated to the information handling system issuing the write command that the data has been successfully stored. This may significantly speed up the acknowledgment back to the information handling system that the data has been successfully stored, allowing the information handling system to proceed to other tasks. Then, when it is convenient for the appropriate storage resource to do so, the data in the designated write cache may be flushed to the persistent storage area of the storage resource, where it becomes "permanently" stored. However, because many write caches are implemented as volatile memory (e.g., memory which loses its data when power is removed), battery backup power may be used to maintain data stored in write caches until such time as main power can be restored and the data flushed to persistent storage.

In many applications, batteries used in connection with storage arrays are managed remotely. As an illustration, batteries are often physically located substantially locally to the storage resources and/or write caches to which they provide backup power, while the management of the batteries (e.g., the detection of battery presence, battery voltage, battery capacity and charging of the batteries) is performed at a location remote from the batteries. For example, as shown in FIG. 1, a storage controller for a storage array may include a charger 102 located remotely from battery pack 112. Charger 102 may be coupled to battery pack 112 via a cable 110. Charger 102 may include circuitry to sense a reference voltage $V_{REF}$ (e.g., via REF_IN pin 106) indicative of the voltage of battery 114, and then charge or supply electrical current to battery 114 (e.g., via CHRG_OUT pin 104) if the $V_{REF}$ is below a specified threshold voltage.

However, one disadvantage of remotely managing the charging of a battery is that the voltage sensed by the sensing circuitry may be substantially different than the voltage actually present at the battery. This may occur as a result of parasitic impedance of the cable coupling the sensing circuitry to the battery, leading to a voltage drop across the cable. For example, in FIG. 1, CHRG_OUT pin 104 may need to supply a sizable electrical current to charge battery 114. Due to the length of cable 110, cable 110 may have a significant parasitic impedance and the electrical current may induce a significant voltage drop across cable 110. Accordingly, the voltage $V_A$ (and accordingly the voltage $V_{REF}$ that tracks $V_A$) would differ significantly from the voltage present at the positive terminal of battery 114. In some applications, this voltage drop may be as much as 10-20% of the maximum voltage of the battery, and thus can lead to inconsistent readings of battery voltage which may in turn negatively effect charger performance.

Numerous solutions to account for the voltage drop across the cable have been attempted, but most still have significant disadvantages and problems. For example, in the approach depicted in FIG. 2, an additional sense point is added to mitigate, but not completely eliminate, problems associated with parasitic cable impedance. In FIG. 2, resistance values of resistors 208a, 208b, and 216 may be selected such that minimal current flows through these resistors when a battery 214 is present. Accordingly, when battery 214 is present, most of the current in the circuit will flow from CHRG_OUT pin 204, through cable 210a, and to battery 214. Because a minimal amount of current flows through resistor 216, the same minimal amount of current will also flow through cable 210b. Because of this minimal current flow, the voltage drop across cable 210b will also be minimal regardless of the parasitic impedance of cable 210b. Accordingly, the voltage at node $V_{REF}$ should approximately equal the voltage at node $V_B$. However, as in the approach depicted in FIG. 1, the voltage $V_A$ would differ significantly from the voltage present at the positive terminal of battery 214 because of the voltage drop across cable 210a. The voltage $V_A$ would have the effect of pulling up the voltage $V_{REF}$ away from the voltage $V_B$. Thus, while the approach in FIG. 2 mitigates the effect of the parasitic impedance of cable 210a, it does not completely eliminate it.

Another solution practically eliminates the effect of the voltage drop across cable 210a, but this solution introduces problems of its own. Under such a solution, the approach of FIG. 2 may be used, but with resistor 208a removed. Without resistor 208a, the voltage $V_A$ would not be able to pull up the voltage $V_{REF}$ from the voltage $V_B$. However, this solution is not practical. In the event a battery pack 212 is not present the voltage $V_{REF}$ would be pulled to ground voltage. Because ground voltage would likely be lower than the threshold voltage needed to indicate a fully-charged battery, a ground voltage received on REF_IN pin 206 may cause one or more problems. As an example, a ground voltage may incorrectly indicate to charger 202 circuitry that a battery is present and requires charging. However, without a battery present, the charger would drive current to an open circuit. This could result in charger instability and damage to the charger. Accordingly, resistor 208a may be needed in the solution set forth in FIG. 2 in order to provide a "dummy" $V_{REF}$ voltage in the event no battery pack 212 is present, as well as to provide a path for CHRG_OUT pin 204 current when no battery pack 212 is present.

SUMMARY

In accordance with the teachings of the present disclosure, disadvantages and problems associated with remote battery sensing and charging have been substantially reduced or eliminated.

In accordance with one embodiment of the present disclosure, a method for remote sensing of a battery is provided. The method may include determining whether a charge output of a battery charger is electrically coupled to a rechargeable battery, wherein the charge output is configured to charge the rechargeable battery. The method may also include electrically coupling a terminal of the rechargeable battery to a reference voltage input of the battery charger in response to determining the charge output is electrically coupled to the rechargeable battery, wherein the battery charger is configured to determine whether the rechargeable battery is to be charged based on the reference voltage input voltage. The method may further include electrically coupling the reference voltage input to the charge output in response to determining the charge output is not electrically coupled to the rechargeable battery.

In accordance with another embodiment of the present disclosure, a system may include a comparator, a first switch, and a second switch. The comparator may be configured to determine whether a charge output of a battery charger is electrically coupled to a rechargeable battery, wherein the charge output is configured to charge the rechargeable battery. The first switch may be configured to electrically couple a terminal of the rechargeable battery to a reference voltage input of the battery charger in response to determining the charge output input is electrically coupled to the rechargeable battery, wherein the battery charger is configured to determine whether the rechargeable battery is to be charged based on the reference voltage input voltage. The second switch may be configured to electrically couple the reference voltage input to the charge output in response to determining the charge output is not electrically coupled to the rechargeable battery.

In accordance with a further embodiment of the present disclosure, a system may include at least one computer-readable medium, a battery charger, and a battery sense assist circuit. The at least one computer-readable medium may be configured to receive electrical energy from a rechargeable battery. The battery charger may include: (i) a charge output configured to provide electrical energy to the rechargeable battery; and (ii) a reference voltage input, the battery charger configured to determine whether the rechargeable battery is to be charged based on the reference voltage input voltage. The battery sense circuit may be electrically coupled to the charger and configured to: (i) determine whether the charge output is electrically coupled to the rechargeable battery; (ii) electrically couple a terminal of the rechargeable battery to the reference voltage input in response to determining the charge output is electrically coupled to the rechargeable battery; and (iii) electrically couple the reference voltage input to the charge output in response to determining the charge output is not electrically coupled to the rechargeable battery.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3A illustrates a block diagram of a system for remotely sensing and charging a battery, in accordance with certain embodiments of the present disclosure;

FIG. 3B illustrates an equivalent circuit diagram of the circuit depicted in FIG. 3A for the case in which a battery pack is present, in accordance with certain embodiments of the present disclosure;

DETAILED DESCRIPTION

Figure 1:
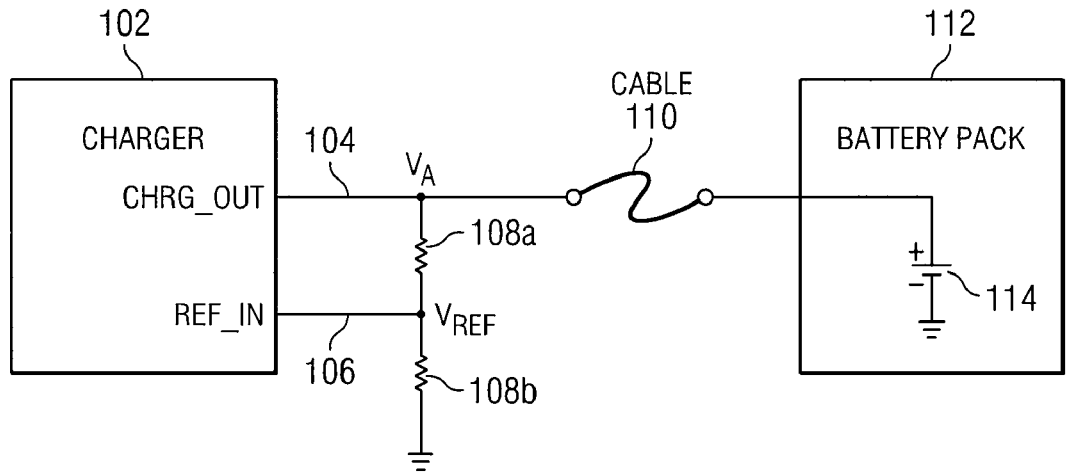
FIG. 1 illustrates a block diagram of a prior art system for remotely sensing and charging a battery.
Figure 2:
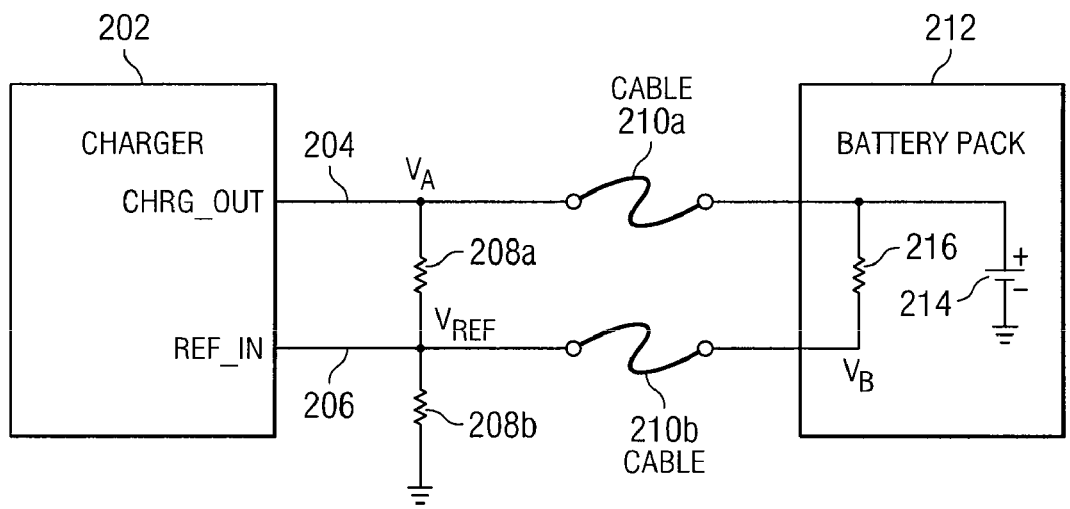
FIG. 2 illustrates a block diagram of another prior art system for remotely sensing and charging a battery.
Figures 3C, 4:
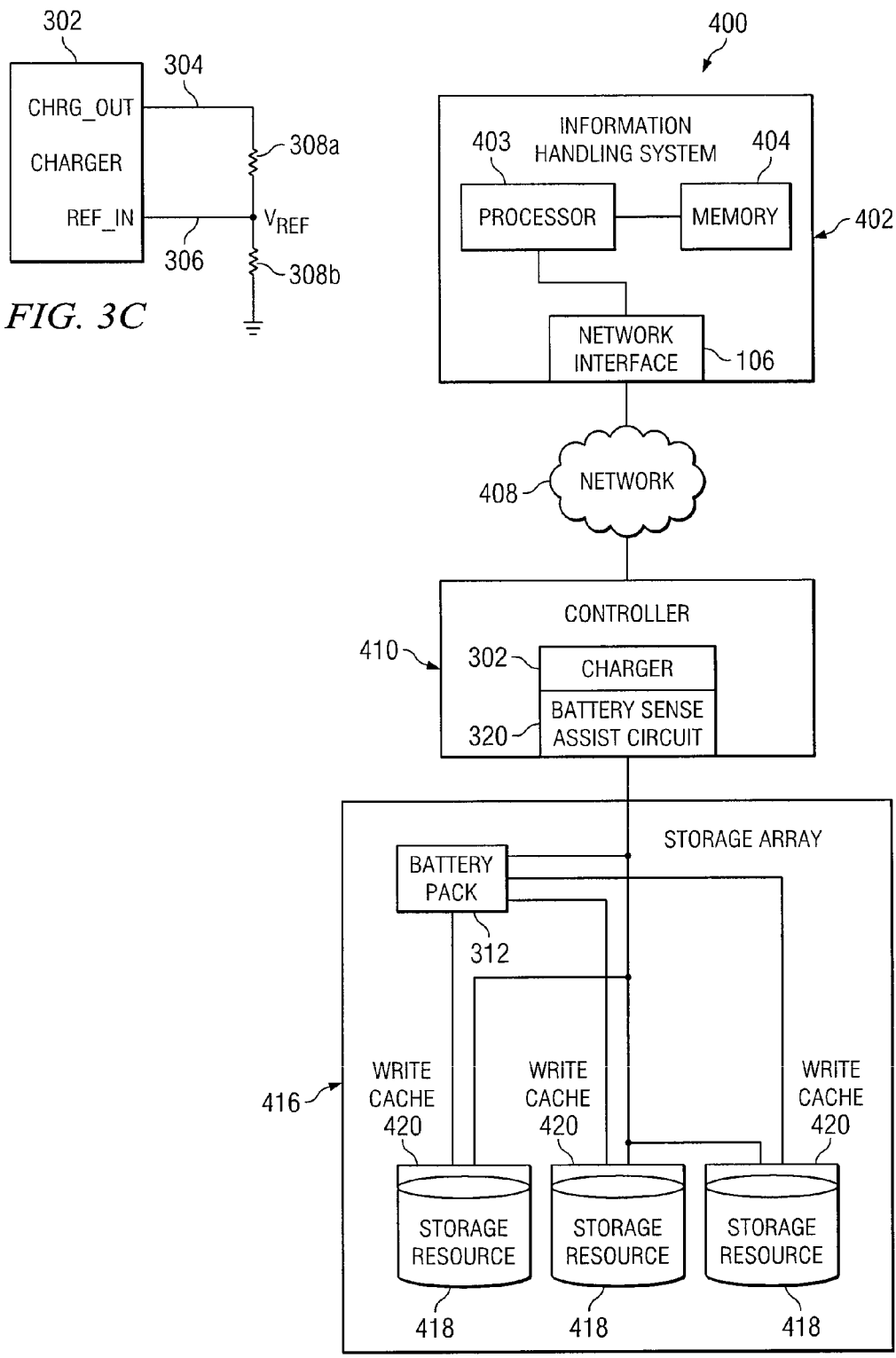
FIG. 3C illustrates an equivalent circuit diagram of the circuit depicted in FIG. 3A for the case in which a battery pack is absent, in accordance with certain embodiments of the present disclosure.
FIG. 4 illustrates a block diagram of a network storage system including a system for remotely sensing and charging a battery, in accordance with certain embodiments of the present disclosure.

Preferred embodiments and their advantages are best understood by reference to FIGS. 3A through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as communications media such wires, optical fibers, microwaves, radio waves, and other electromagnetic and/or optical carriers; and/or any combination of the foregoing.

As discussed above, an information handling system may include or may be coupled via a network to an array of physical storage resources. The array of physical storage resources may include a plurality of physical storage resources, and may be operable to perform one or more input and/or output storage operations, and/or may be structured to provide redundancy. In operation, one or more physical storage resources disposed in an array of physical storage resources may appear to an operating system as a single logical storage unit or "logical unit."

In certain embodiments, an array of physical storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID levels, including without limitation, standard RAID levels (e.g., RAID 0, RAID 1, RAID 3, RAID 4, RAID 5, and RAID 6), nested RAID levels (e.g., RAID 01, RAID 03, RAID 10, RAID 30, RAID 50, RAID 51, RAID 53, RAID 60, RAID 100), non-standard RAID levels, or others.

FIG. 3A illustrates a block diagram of a system 300 for remotely sensing and charging a battery 314, in accordance with certain embodiments of the present disclosure. As depicted in FIG. 3A, system 300 may include a charger 302, a battery pack 312, cables 310a and 310b, and a battery sense assist circuit 320.

Charger 302 may include any system, device or apparatus configured to receive a reference voltage and/or another indication of a charging status of a battery, and based on such received indication, determine whether to supply electrical current to a battery in order to charge the battery. As shown in FIG. 3A, charger 302 may include a CHRG_OUT pin 304 and REF_IN pin 306. In operation, charger 302 may receive a reference voltage $V_{REF}$ indicative of the voltage of battery 314. Charger 302 may also determine whether $V_{REF}$ exceeds a threshold voltage, indicating that battery 314 is sufficiently charged, or whether $V_{REF}$ does not exceed the threshold voltage, indicating that battery 314 is not sufficiently charged. If $V_{REF}$ does not exceed the threshold voltage, charger 302 may provide an electrical current via CHRG_OUT pin 304 to charge battery 314. As shown in FIG. 3A, the electrical current provided to charge battery 314 may be provided via cable 310a.

Each cable 310a and 310b may be any device or apparatus operable to convey an electrical current and/or electrical signal between battery pack 312 and battery sense assist circuit 320. Examples of cables 310 may include, without limitation, conductive power supply cables and solid conductive ribbon cables.

Battery pack 312 may include any system, device or apparatus configured to house or otherwise enclose battery 314, and provide electrical connectivity between battery 314 and other components of system 300. As shown in FIG. 3A, battery pack 312 may include a rechargeable battery 314 and a resistor 316. Rechargeable battery 314 may include any system, device, or apparatus configured to store electrochemical energy and provide electrical energy. As its name suggests, rechargeable battery 314 may be rechargeable, meaning that it may have its electrochemical energy restored by the application of electrical energy. Rechargeable battery 314 may include a lead and sulfuric acid battery, nickel cadmium (NiCd) battery, nickel metal hydride (NiMH) battery, lithium ion (Li-ion) battery, lithium ion polymer (Li-ion polymer) battery, or any combination of the foregoing. In operation, rechargeable battery 314 may provide electrical energy to one or more electrical or electronic components (e.g., storage array 416 and/or storage resources 418 depicted in FIG. 4; or write caches associated with one or more storage resources). In addition, rechargeable battery 314 may be recharged by charger 302.

Resistor 316 may be any system, device or apparatus that includes at least two terminals and opposes an electric current by producing a voltage drop between its terminals in proportion to the current. As shown in FIG. 3A, resistor 316 may be selected so as to achieve a minimal or near zero current through cable 310b, in order to minimize any voltage drop across cable 310b.

Battery sense assist circuit 320 may include any system device or apparatus configured to determine if a battery pack 312 is present and close a switch to couple an electrical node within battery pack 312 to REF_IN pin 306 of charger 102 in the event battery pack 312 is present. If battery pack 312 is not present, battery sense circuit 320 may close a switch to couple CHRG_OUT pin 304 to REF_IN pin 306 in order to provide stability to charger 302 in the absence of battery pack 312. As shown in FIG. 3A, battery sense assist circuit may include resistors 308a and 308b, a comparator 322, an inverter 324, and switches 326 and 328.

Each resistor 308a and 308b may be any system, device or apparatus that includes at least two terminals and opposes an electric current by producing a voltage drop between its terminals in proportion to the current. As shown in FIG. 3A, resistor 308a may be selected so as to achieve a minimal or near zero current through resistor 308a, and resistor 308b may be selected so as to achieve a minimal or near zero current through resistor 308b in order to minimize any voltage drop across cable 310b.

Comparator 322 may include any system, device or apparatus configured to compare a first voltage at one of its input to a second voltage at another one of its inputs, produce a specified output voltage if the first voltage is greater than the second voltage, and produce a different specified output voltage if the first voltage is not greater than the second voltage. In this sense, comparator 322 may be thought of as a one-bit analog-to-digital converter, as it receives analog voltages at its inputs and produces a binary output. For example, as shown in FIG. 3A, one input terminal of comparator may receive the voltage $V_B$ at one of its inputs, and the voltage $V_{PRES}$ at its other input. If $V_B > V_{PRES}$, comparator 322 may output a high voltage, symbolic of a logic value of "1," to indicate $V_B$ greater than $V_{PRES}$. Otherwise, comparator 322 may output a low voltage, symbolic of a logic value of "0," to indicate that $V_B$ is not greater than $V_{PRES}$. In operation of system 300, a voltage of $V_B$ greater than $V_{PRES}$ may indicate the presence of battery pack 312, while voltage of $V_B$ not greater than $V_{PRES}$ may indicate the absence of battery pack 312. Thus, if battery pack 312 is present comparator 322 may output a high voltage (logic 1), and if battery pack 312 is absent comparator 322 may output a low voltage (logic 0).

Inverter 324 may include any system, device or apparatus configured to invert a digital signal driven on its input. For example, if inverter 324 receives a low voltage (e.g., logic 0) driven on its input, it may drive a high voltage (e.g., logic 1) on its output. Alternatively, if inverter 324 receives a high voltage (e.g., logic 1) driven on its input, it may drive a low voltage (e.g., logic 0) on its output. Inverter 324 may be implemented as a PMOS inverter, NMOS inverter, static CMOS inverter, saturated-load digital inverter, or any other suitable implementation.

Each switch 326 and 328 may be any system, device or apparatus operable to make or break an electrical circuit based on a voltage driven on its input. For example, if switch 326 receives a high voltage (logic 1) driven on its input, it may make or complete an electrical circuit between cable 310b and REF_IN pin 306. Otherwise, if switch 326 receives a low voltage (logic 0) driven on its input, it may break an electrical circuit between cable 310b and REF_IN pin 306, effectively leaving an open circuit. Similarly, if switch 328 receives a high voltage (logic 1) driven on its input, it may make or complete an electrical circuit between resistor 308a and CHRG_OUT pin 304. Otherwise, if switch 328 receives a low voltage (logic 0) driven on its input, it may break an electrical circuit between resistor 308a and CHRG_OUT pin 304, effectively leaving an open circuit. Each switch 326, 328 may include a field effect transistor (FET) switch.

The operation of battery sense assist circuit 322 is illustrated in FIGS. 3B and 3C. FIG. 3B illustrates an equivalent circuit diagram of system 300 depicted in FIG. 3A for the case in which battery pack 312 is present, in accordance with certain embodiments of the present disclosure. Alternatively, FIG. 3C illustrates an equivalent circuit diagram of system 300 depicted in FIG. 3A for the case in which battery pack 312 is absent, in accordance with certain embodiments of the present disclosure.

In the event that battery pack 312 is present, comparator 322 may determine that voltage $V_B$ is greater than $V_{PRES}$, thus indicating that battery pack 312 is present. Accordingly, comparator 322 may drive a high voltage (logic 1) at its output. The high voltage (logic 1) driven by comparator 322 may be received at the inputs of inverter 324 and switch 326. Receiving a high voltage (logic 1) driven on its input, inverter 124 may drive a low voltage (logic 0) on its output.

Switch 326 may receive the high voltage (logic 1) signal driven on its input and may make or complete an electrical circuit between cable 310b and REF_IN pin 306 as shown in FIG. 3B. Similarly, switch 328 may receive the low voltage (logic 0) signal driven on its input and may break the electrical circuit between CHRG_OUT pin 304 and resistor 308a, also as shown in FIG. 3B. Thus, when battery pack 312 is present, the voltage $V_{REF}$ may be electrically isolated from the voltage $V_A$ such that any voltage drop across cable 310a due to parasitic impedance does not pull up or otherwise affect voltage $V_{REF}$. In addition, if resistors 316 and/or 308b are selected to allow for a minimal current through cable 310b, $V_{REF}$ may be substantially equal to $V_B$.

In the event that battery pack 312 is absent, comparator 322 may determine that voltage $V_B$ is not greater than $V_{PRES}$, thus indicating that battery pack 312 is absent. Accordingly, comparator 322 may drive a low voltage (logic 0) at its output. The low voltage (logic 0) driven by comparator 322 may be received at the inputs of inverter 324 and switch 326. Receiving a low voltage (logic 0) driven on its input, inverter 124 may drive a high voltage (logic 1) on its output.

Switch 326 may receive the low voltage (logic 0) signal driven on its input and may break the electrical circuit between cable 310b and REF_IN pin 306 as shown in FIG. 3C. Similarly, switch 328 may receive the high voltage (logic 1) signal driven on its input and may make or complete the electrical circuit between CHRG_OUT pin 304 and resistor 308a, also as shown in FIG. 3C. Thus, when battery pack 312 is absent, CHRG_OUT pin 304 may be electrically coupled to REF_IN pin 306 via resistor 308a, providing stability to charger 302.

FIG. 4 illustrates a block diagram of an example network storage system 400 including charger 302 and battery sense assist circuit 320 for remotely sensing and charging battery pack 312, in accordance with certain embodiments of the present disclosure. As depicted in FIG. 4, system 400 may include an information handling system 402, a network 108, a controller 410, and a storage array 416.

Information handling system 402 may generally be operable to read data from and/or write data to one of more storage resources 418 of storage array 416. In certain embodiments, information handling system 402 may be a server. In other embodiments, information handling system 402 may be a personal computer (e.g., a desktop or portable computer). As depicted in FIG. 4, information handling system 402 may include a processor 403, a memory 404 communicatively coupled to processor 403, and a network interface 406 coupled to processor 403.

Processor 403 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 403 may interpret and/or execute program instructions and/or process data stored in memory 404 and/or another component of information handling system 402.

Memory 404 may be communicatively coupled to processor 403 and may comprise any system, device, or apparatus operable to retain program instructions or data for a period of time. Memory 404 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 402 is turned off.

Network interface 406 may be any suitable system, apparatus, or device operable to serve as an interface between information handling system 402 and network 408. Network interface 406 may enable information handling system 402 to communicate via network 408 using any suitable transmission protocol and/or standard, including without limitation all transmission protocols and/or standards enumerated below with respect to the discussion of network 408.

Although system 400 is depicted as having one information handling system 402, system 400 may have any number of information handling systems 402.

Network 408 may be a network and/or fabric configured to communicatively couple information handling system 402 to storage array 416. In certain embodiments, network 408 may allow information handling system 402 to couple to storage resources 418 such that the storage resources 418 and/or logical units comprising storage resources 418 appear to information handling system 402 as locally-attached storage resources. In the same or alternative embodiments, network 408 may include a communication infrastructure, which provides physical connections, and a management layer, which organizes the physical connections between network 408, network interface 406 and storage array 416. In the same or alternative embodiments, network 408 may allow block I/O services and/or file access services to storage resources 418 disposed in storage array 416.

Network 408 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 408 may transmit data using any communication protocol, including without limitation, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. Further, network 408 may transport data using any storage protocol, including without limitation, Fibre Channel, Internet SCSI (iSCSI), Serial Attached SCSI (SAS), or any other storage transport compatible with SCSI protocol. Network 408 and its various components may be implemented using hardware, software, or any combination thereof.

Controller 410 may be any suitable system, device, or apparatus that manages storage resources 418 of storage array 416 and/or presents them to information handling system 402 as logical units and/or virtual storage resources (e.g., a RAID controller). For example, if a RAID implemented using the storage resources 418 of storage array 416, controller 410 may control how stored data is mirrored and/or striped among storage resources 418, and may present such RAID as a single logical unit or virtual storage resource to information handling system 402. In some example embodiments, controller 410 may be an integral part of a storage enclosure housing one or more of storage resources 418. In other example embodiments, controller 410 may be an integral part of information handling system 402. In the same or alternative embodiments, controller 410 may include a Dell PowerEdge Expandable RAID Controller (PERC).

As depicted in FIG. 4, controller 410 may include charger 302 and battery sense assist circuit 320. In some embodiments, charger 302 and/or battery sense assist circuit 320 may be identical or similar to charger 302 and/or battery sense assist circuit 320 shown in FIG. 3A.

As depicted in FIG. 4, storage array 416 may include one or more physical storage resources 418 and one or more battery packs 312, and may be communicatively coupled to information handling system 402 and/or network 408, in order to facilitate communication of data between information handling system 402 and storage resources 418. Storage resources 418 may include hard disk drives, magnetic tape libraries, optical disk drives, magneto-optical disk drives, compact disk drives, compact disk arrays, disk array controllers, and/or any computer-readable medium operable to store data. Each of storage resources may have associated therewith a write cache 420.

Each write cache 420 may include any computer-readable medium (e.g., a memory) communicatively coupled to its associated storage resource 418. In operation, write caches 420 may be used to speed up and/or increase the efficiency of writing data to one or more of storage resources 418. For example, when data from information handling system 402 is to be written to a storage resource 418, rather than immediately store the data onto a storage resource's persistent storage (e.g., hard disk drives), the data may be instead be stored in a storage resource 418 and a signal may be communicated to information handling system 402 the data has been successfully stored. This may significantly speed up the acknowledgment back to information handling system 402 that the data has been successfully stored, allowing information handling system 402 to proceed to other tasks. Then, when it is convenient for the appropriate storage resource 418 to do so, the data in the designated write cache 420 may be flushed to the persistent storage area of the storage resource 418, where it becomes "permanently" stored. In certain embodiments, one or more of write caches 420 may be a volatile cache that does not maintain the storage of cached data when power is removed from the write cache 420. Accordingly, backup electrical energy from battery pack 312 may be used in the event of a main power failure to a write cache 420 in order to maintain data stored in the write cache for a period of time in order to allow main power to return, and the cached data to be flushed to the appropriate storage resource 418.

Battery pack 312 may be identical of similar to battery pack 312 depicted in FIG. 3A, and may be coupled to one or more of storage resources 418, and/or one or more write caches 420 associated with storage resources 418. In operation, battery pack 312 may provide redundant or backup power to storage resources 418 or write caches 420 associated therewith.

Using the methods and systems disclosed herein, problems associated conventional approaches to remote battery sensing and charging may be reduced or eliminated. For example, the methods and systems disclosed may allow for the reduction of elimination of the effects of cable parasitic impedance present in traditional approaches, while still allowing for battery charger stability when a battery pack is absent.

Although the present disclosure has been described in detail, it should be understood that various changes, substitutions, and alterations can be made hereto without departing from the spirit and the scope of the invention as defined by the appended claims.

What is claimed is:

1. A method for remote sensing of a battery, comprising:
    determining whether a charge output of a battery charger is electrically coupled to a rechargeable battery, wherein the charge output is configured to charge the rechargeable battery;
    electrically coupling, via a first switch, a terminal of the rechargeable battery to a reference voltage input of the battery charger in response to determining the charge output is electrically coupled to the rechargeable battery, wherein the battery charger is configured to determine whether the rechargeable battery is to be charged based on the reference voltage input voltage; and
    electrically coupling, via a second switch, the reference voltage input to the charge output in response to determining the charge output is not electrically coupled to the rechargeable battery.

2. A method according to claim 1, wherein determining whether the charge output is electrically coupled to the rechargeable battery includes sampling a voltage indicative of a level of charge of the rechargeable battery.

3. A method according to claim 2, wherein determining whether the charge output is electrically coupled to the rechargeable battery further includes comparing the sampled voltage to a threshold voltage.

4. A method according to claim 3, further comprising electrically coupling the terminal of the rechargeable battery to the reference voltage input in response to determining that the sampled voltage exceeds the threshold voltage.

5. A method according to claim 3, further comprising electrically coupling the reference voltage input to the charge output in response to determining the that the threshold voltage exceeds the sampled voltage.

6. A method according to claim 1, wherein electrically coupling the terminal of the rechargeable battery to the reference voltage input includes electrically coupling the terminal to the reference voltage input via a resistor configured to minimize the current between the terminal and the reference voltage input.

7. A method according to claim 1, wherein electrically coupling the reference voltage input to the charge output includes electrically coupling the reference voltage input to the charge output via a resistor configured to stabilize the operation of the charger in the absence of the rechargeable battery.

8. A system, comprising:
a comparator configured to determine whether a charge output of a battery charger is electrically coupled to a rechargeable battery, wherein the charge output is configured to charge the rechargeable battery;
a first switch configured to electrically couple a terminal of the rechargeable battery to a reference voltage input of the battery charger in response to determining the charge output input is electrically coupled to the rechargeable battery, wherein the battery charger is configured to determine whether the rechargeable battery is to be charged based on the reference voltage input voltage; and
a second switch configured to electrically couple the reference voltage input to the charge output in response to determining the charge output is not electrically coupled to the rechargeable battery.

9. A system according to claim 8, the comparator configured to sample a voltage indicative of a level of charge of the rechargeable battery in order to determine whether the charge output is electrically coupled to the rechargeable battery.

10. A system according to claim 9, the comparator further configured to compare the sampled voltage to a threshold voltage to determine whether the charge output is electrically coupled to the rechargeable battery.

11. A system according to claim 10, further comprising the first switch configured to electrically couple the terminal of the rechargeable battery to the reference voltage input in response a determination by the comparator that the sampled voltage exceeds the threshold voltage.

12. A system according to claim 10, further comprising the second switch configured to electrically couple the reference voltage input to the charge output in response to a determination by the comparator that the threshold voltage exceeds the sampled voltage.

13. A system according to claim 10, further comprising a resistor configured to:
be electrically coupled between the terminal of the rechargeable battery and the reference voltage input in response a determination by the comparator that the charge output is electrically coupled to the rechargeable battery; and
minimize the current between the terminal and the reference voltage input.

14. A system according to claim 10, further comprising a resistor configured to:
be electrically coupled between the reference voltage input and the charge output in response to a determination by the comparator that the charge output is not electrically coupled to the rechargeable battery; and
stabilize the operation of the charger in the absence of the rechargeable battery.

15. A system comprising:
at least one computer-readable medium configured to receive electrical energy from a rechargeable battery;
a battery charger including:
a charge output configured to provide electrical energy to the rechargeable battery; and
a reference voltage input, the battery charger configured to determine whether the rechargeable battery is to be charged based on the reference voltage input voltage; and
a battery sense assist circuit electrically coupled to the charger and configured to:
determine whether the charge output is electrically coupled to the rechargeable battery;
electrically couple, via a first switch, a terminal of the rechargeable battery to the reference voltage input in response to determining the charge output is electrically coupled to the rechargeable battery; and
electrically couple, via a second switch, the reference voltage input to the charge output in response to determining the charge output is not electrically coupled to the rechargeable battery.

16. A system according to claim 15, the battery sense assist circuit further configured to sample a voltage indicative of a level of charge of the rechargeable battery in order to determine whether the charge output is electrically coupled to the rechargeable battery.

17. A system according to claim 16, the battery sense assist circuit further configured to compare the sampled voltage to a threshold voltage in order to determine whether the charge output is electrically coupled to the rechargeable battery.

18. A system according to claim 17, the battery sense assist circuit further configured to electrically couple the terminal of the rechargeable battery to the reference voltage input in response to determining that the sampled voltage exceeds the threshold voltage.

19. A system according to claim 17, the battery sense assist circuit further configured to electrically couple the reference voltage input to the charge output in response to determining the that the threshold voltage exceeds the sampled voltage.

20. A system according to claim 15, the battery sense assist circuit further configured to electrically couple the terminal to the reference voltage input via a resistor configured to minimize the current between the terminal and the reference voltage input in response to the determination that the charge output is electrically coupled to the rechargeable battery.

21. A method according to claim 15, the battery sense assist circuit further configured to electrically couple the reference voltage input to the charge output via a resistor configured to stabilize the operation of the charger in the absence of the rechargeable battery in response to the determination that the charge output is not electrically coupled to the rechargeable battery.

* * * * *